(12) United States Patent
Cao

(10) Patent No.: US 7,309,847 B2
(45) Date of Patent: Dec. 18, 2007

(54) CERAMIC OXYGEN GENERATING OVEN

(75) Inventor: Tuan Q. Cao, Davenport, IA (US)

(73) Assignee: Carleton Life Support Systems, Inc., Orchard Park, NY (US)

( * ) Notice: Subject to any disclaimer, the term of this patent is extended or adjusted under 35 U.S.C. 154(b) by 0 days.

(21) Appl. No.: 11/613,041

(22) Filed: Dec. 19, 2006

(65) Prior Publication Data

US 2007/0158329 A1   Jul. 12, 2007

Related U.S. Application Data

(60) Provisional application No. 60/766,352, filed on Jan. 12, 2006.

(51) Int. Cl.
    *B01D 17/00* (2006.01)
    *B01D 59/26* (2006.01)
    *F27B 5/16* (2006.01)
    *F27B 17/00* (2006.01)
    *F27D 11/00* (2006.01)
(52) U.S. Cl. .................. 219/400; 219/393; 96/152
(58) Field of Classification Search .............. None See application file for complete search history.

(56) References Cited

U.S. PATENT DOCUMENTS

| | | | | |
|---|---|---|---|---|
| 3,772,881 A | * | 11/1973 | Lange | .............. 60/39.182 |
| 4,046,492 A | | 9/1977 | Inglis | |
| 4,336,442 A | * | 6/1982 | Starr | .............. 219/400 |
| 5,871,624 A | | 2/1999 | Crome | |
| 5,985,113 A | | 11/1999 | Crome et al. | |
| 6,194,335 B1 | | 2/2001 | Crome et al. | |
| 6,783,646 B2 | * | 8/2004 | Sehlin et al. | .............. 204/279 |
| 2005/0061795 A1 | * | 3/2005 | Paller | .............. 219/400 |
| 2006/0062707 A1 | * | 3/2006 | Crome et al. | .............. 422/305 |

* cited by examiner

*Primary Examiner*—J. Pelham
(74) *Attorney, Agent, or Firm*—Marsteller & Associates, P.C.

(57) ABSTRACT

An over (10) for a gas generating system (C) of the type that includes an interior chamber (22), heating elements (12), at least one gas generating module (14) mounted within the interior chamber (22), an air inlet (26) providing an input source of air, and a product gas outlet (16) includes an air amplifier member (20) that is mounted within the interior chamber (22). The air amplified (20) generates an amplification of the air flow characteristics of the input source of air as the input air is introduced into the interior chamber (22) of the oven (10). The amplification promotes the oven air recirculation improving thermal uniformity and air distribution inside the oven (10).

8 Claims, 3 Drawing Sheets

CERAMIC OXYGEN GENERATING OVEN

CROSS REFERENCE TO RELATED APPLICATIONS

This application claims the benefit of U.S. Provisional Application Ser. No. 60/766,352, filed Jan. 12, 2006, entitled CERAMIC OXYGEN GENERATING OVEN.

BACKGROUND OF THE INVENTION

1. Technical Field

The invention relates to the field of gas separation devices. More specifically, devices that use an electrochemical process to separate one gas (oxygen for example) from a mixture of gasses (air for example).

2. Background Art

In one embodiment of a gas generating system, a solid-state process is used to separates oxygen from atmospheric acid for medical or industrial uses. Such a device is called a ceramic oxygen generating system of COGS. Ceramic oxygen generating (COG) modules operate at elevated temperature. Depending on the type of material used to make the COG modules, the operating temperature can be as high as 800° C. To bring COG modules to operating temperature and keep them at that temperature, a furnace or oven is frequently used.

An inlet air flow is required to the oven. The input airflow is preferably 10 to 25 times the oxygen output flow to maintain minimum oxygen concentration inside the oven. The air input-to-oxygen output ratio depends on the recirculation of internal oven air. The better the recirculation generally correlates to a lower input/output ratio.

Most of the existing oven designs require heat exchangers to bring the inlet air temperature close to the internal oven temperature, and to recapture heat from the exhausting air stream. The oven generally has to operate at an elevated pressure in order to generate adequate flow through the heat exchanger. Ovens with heat exchangers are more complicated, more difficult to assemble, and have less air recirculation.

The present invention describes an oven that supplies input air to the COG modules using an air amplifier. Air amplifiers similar to the one described in U.S. Pat. No. 4,046,492 can amplify the air flow up to 25 times the inlet air flow.

Generally, prior art equipment is subject to the following disadvantages:

Heat exchangers required

Pressurized oven requires sealed oven

Lack of air circulation requires high input/output ratio

Similarly, the print invention should have the following advantages:

High air circulation

Low input/output ratio

Require no heat exchanger

Oven at ambient pressure

While the above cited references introduce and disclose a number of noteworthy advances and technological improvements within the art, none completely fulfills the specific objectives achieved by this invention.

DISCLOSURE OF INVENTION

In accordance with the present invention, an oven for a gas generating system of the type that includes an interior chamber, heating elements, at least one gas generating module mounted within the interior chamber, an air inlet providing an input source of air, and a product gas outlet, and which gas generating module includes an air amplifier member that is mounted within the interior chamber. The air amplifier generates an amplification of the air flow characteristics of the input source of air as the input air is introduced into the interior chamber of the oven.

The required COG inlet air is used to drive the amplifier. Oven air is recirculated as amplified air-flow by the amplifier. By recirculating the oven air more vigorously than with a heat exchanger, the required input/out ratio can be lowered to a lowest ratio: 10/1, for example. Lowering the input/output ratio decreases the energy required to heat the inlet air up to oven temperature. The heat generated by the COG during oxygen generation is sufficient to bring 10 parts of inlet air from ambient temperature to oven temperature. Therefore, no heat recovery from the exhaust is necessary. Hence, no heat exchanger is required for the oven.

There and other objects, advantages and preferred features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

MODE(S) FOR CARRYING OUT THE INVENTION

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

U.S. Pat. No. 5,985,113 issued on Nov. 16, 1999, U.S. Pat. No. 5,871,624 issued on Feb. 16, 1999 and U.S. Pat. No. 6,194,335 issued on Feb. 27, 2001, all of which are incorporated herein in their entirety and assigned to the instant assignee, teach how an electrochemical oxygen generating device can be manufactured that not only generates oxygen, but can be used to deliver the oxygen gas at elevated pressures. It should be understood that terms such as "left" and "right" as used herein are to be construed in the relative sense and that the present invention is usable in any orientation.

Figure 1:
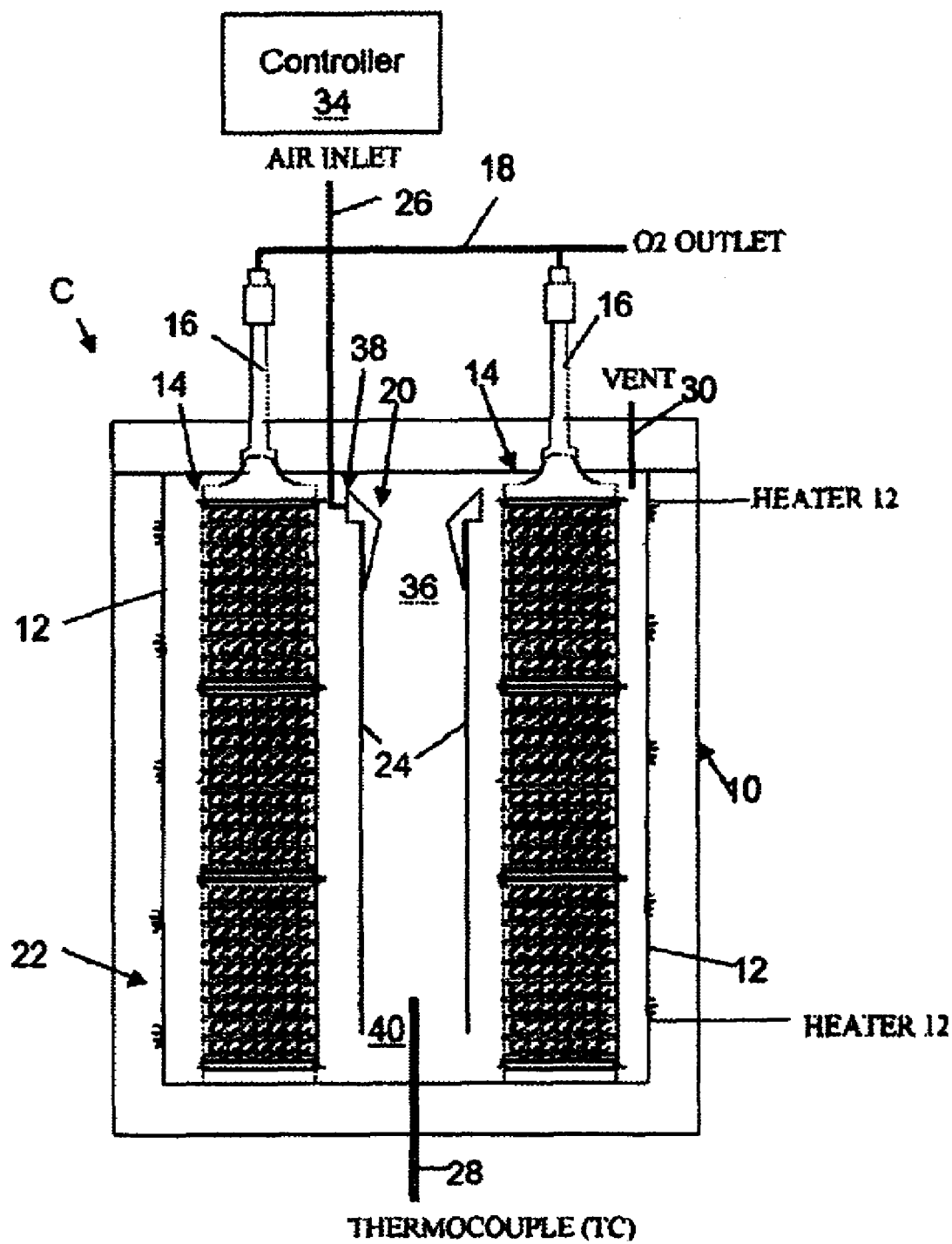
FIGS. 1 through 2 are side views of an oven of the present invention in cross section having two ceramic elements for producing a desired gas.

As shown in FIG. 1, the COG oven System C consists of an insulation oven 10 with embedded heater element 12 and the following components. The COG modules 14 are placed inside the oven 10 with product or delivery tubes 16 being connected to a manifold 18 for summing or aggregating the desired gas outputs.

An air amplifier unit 20 is placed inside an inner chamber 22 of the oven 10 with the outer or exit end 36 of the air amplifier 20 connected to an air guide 24. The inlet air source 26 is connected to the drive port 38 of the amplifier unit 20. The air amplifier 20 is to controllably increase air pressure and generally is a venturi type device having an internal tapering construction to increase the fluid flow velocity or a device as taught in U.S. Pat. No. 4,046,492, cited above.

A thermocouple 28 is optionally placed inside the inner chamber 22 of the oven 10 for temperature control during warm-up and during operation. There is a vent 30 to allow oxygen-depleted air to exhaust from the inner or interior chamber 22 of the oven 10.

Figure 2:
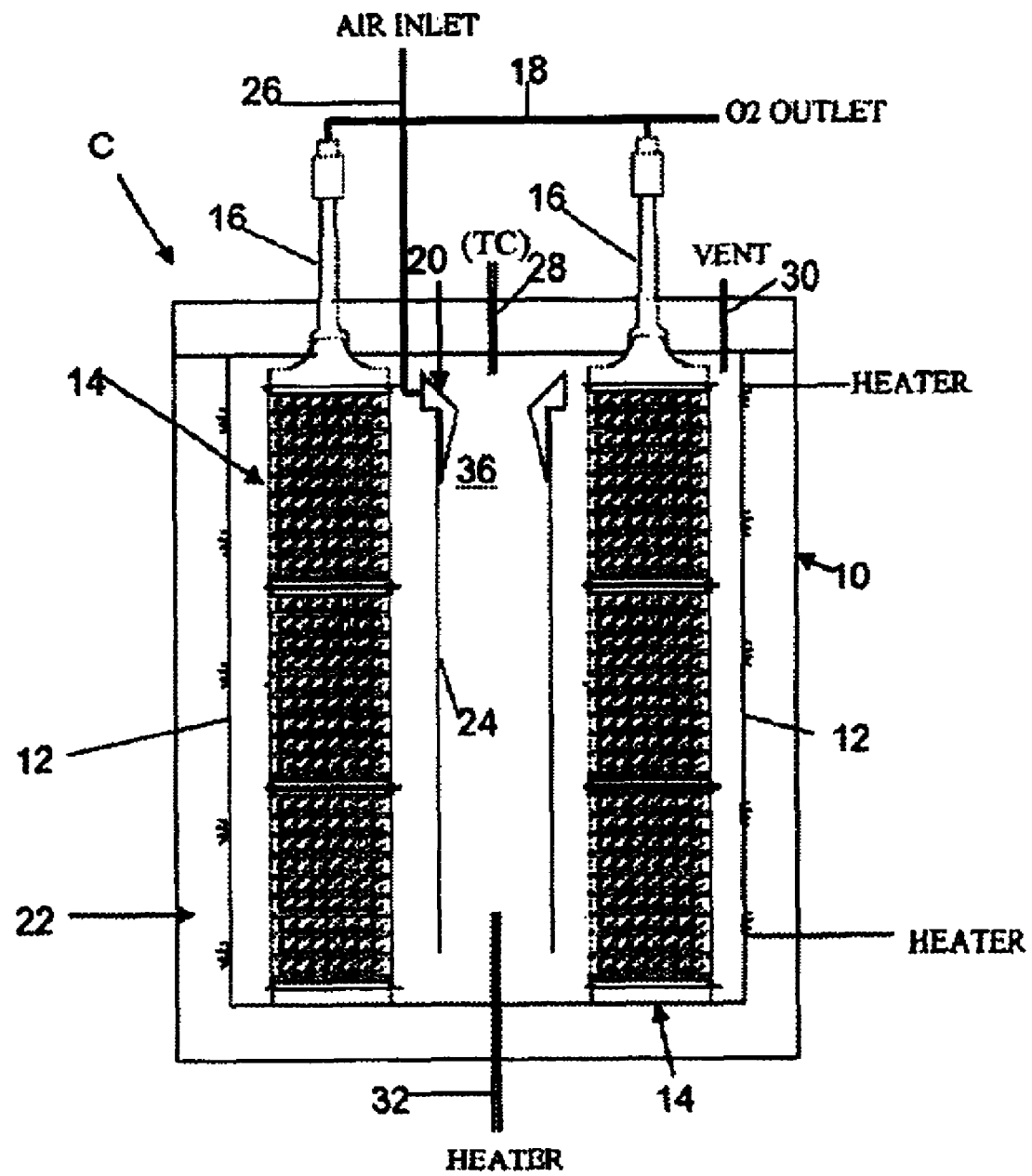

As shown in FIG. 2, an optional heater rod 32 can be placed in the air stream for temperature control during operation.

Figure 3:
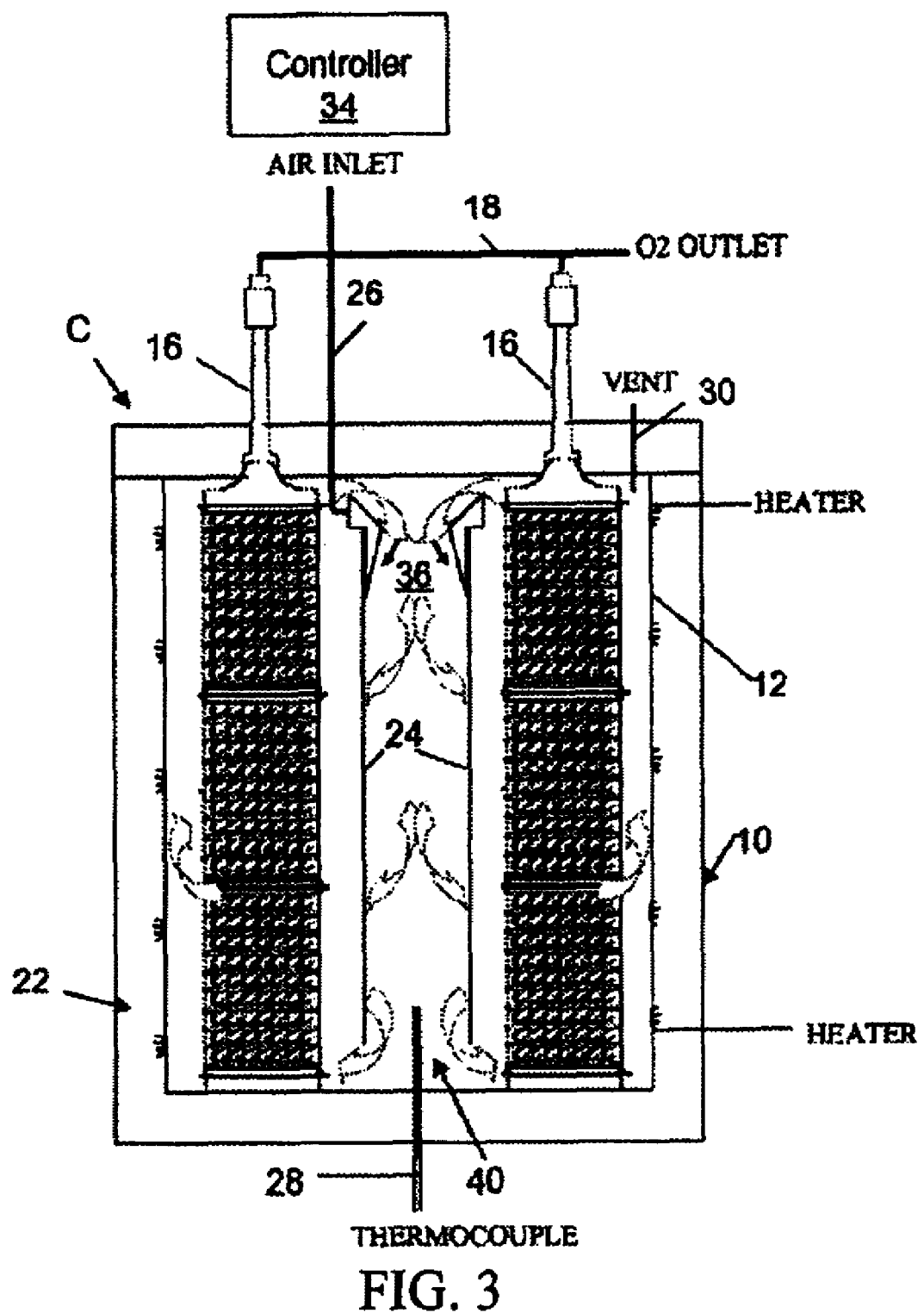
FIG. 3 is another side view of an oven of the present invention in cross section schematically showing typical air flow paths and directions through the oven member.

FIG. 3 shows typical air flow patterns in the inner chamber 22. Cold inlet air injected from the output end 36 of the amplifier unit 22 mixes with hot air within the oven to generates a warm air mixture. During traveling along the length of the air guide 24, the warm air is heated up to a desired oven temperature. The hot air exits the air guide 24 through exit area 40 (or elsewhere along the length of the air guide 24 as desired) and circulates to the inlet end of the amplifier 20 or the upper end in the interior chamber 22 of the oven unit 10 as shown relative to FIG. 3.

The COG oven 10 is used as one component or subassembly of a COG system C. One or more COG ovens 10 can be used in the system with a special control algorithm. During warm-up, it is necessary to control the temperature ramp rate so that the COG modules or elements 14 will not be thermally shocked. Since inlet and circulated-air flows depend on inlet air pressure, a controller unit 34 can control inlet air pressure during operation. Inlet air pressure can be applied only when the oven 10 reaches a minimum operating temperature and power is applied to the COG modules 14 or the inlet air pressure can be applied continuously during warm-up of the COG modules for better thermal uniformity.

Inlet air pressure is set to achieve the required input/output ratio (n parts, i.e. 10 for 10/1 ratio). During operation, oxygen is removed from the inlet air; therefore, n-1 parts of oxygen-depleted air will exhaust from the oven. The COG oven 10 can be designed in order that during operation, the total thermal loss (from the exhaust and through heat conduction) is little greater than the heat generated by the COG modules 14 during oxygen generation. With greater heat loss, thermal run away is generally avoided and the heater 12 is used as a supplement heat source for controlling the oven temperature.

With good air recirculation, the present invention generally requires by way of example 10 parts of inlet air for one part of oxygen output (i.e. 10 LPM of air for 1 LPM of oxygen output) and the heat generated by the COG modules is sufficient (or almost sufficient) to bring the full amount of inlet air (10 LPM for 1 LPM oxygen oven) from ambient temperature to oven temperature. Assuming for purposes of demonstration there is not heat loss from the oven, the air inside the oven is already at oven (operating) temperature. Therefore, the energy required to keep the whole oven at operating temperature is the same as the energy required to heat the incoming air from ambient to oven temperature.

The amplification promotes oven air recirculation and mixing of low-temperature inlet air with high temperature oven air, thereby improving thermal uniformity and air distribution inside the oven 10.

Optimization can be done to conserve power by minimizing the power required from the heater 12 to maintain the oven temperature. Input/output ratio (hence, inlet air pressure with constant output) and oven insulation define the total heat loss of the COG oven.

From the oven concept described above, one can construct different COG ovens as shown below and as chosen for a specific application:
1. placing the amplifier outside the oven with inlet and outlet connections with the oven;
2. using oven without embedded heater and with separate heater element(s);
3. preheat inlet air using inline heater.
4. adding an amplifier to mix cool air with hot exhaust air (to cool the exhaust); or,
5. pulsing inlet air instead of varying pressure to control average air flow.

The foregoing disclosure and description of the invention are illustrative and explanatory thereof, and various changes in the size, shape and materials, as well as in the details of the illustrated construction may be made without departing from the spirit of the invention.

The invention claimed is:

1. An oven for an electro-chemical gas generating system of the type that includes an interior chamber, heating elements, at least one gas generating module mounted within the interior chamber, an air inlet providing an input source of air, and a product gas outlet, the invention comprising:
   an air amplifier member means mounted within the interior chamber for generating air flow amplification characteristics of the input source of air introduced into the interior chamber of the oven to promote air recirculation and mixing of low-temperature inlet air with high temperature oven air.

2. The invention of claim 1 wherein the air amplifier member has an exit and an air guide body is attached to the exit of the air amplifier to guide and assist in raising a temperature of the air exiting from the air amplifier member.

3. The invention of claim 1 wherein the air amplifier member includes a venture element for increasing fluid flow velocity therethrough.

4. The invention of claim 1 further including a heater element mounted within the air amplifier member.

5. A method for improving air flow characteristics of an electrochemical gas generating system of the type that includes an interior chamber, heating elements, at least one gas generating module mounted within the interior chamber, an air inlet providing an input source of air, and a product gas outlet, the steps comprising:
   providing the input source of air to an air amplifier member mounted within the interior chamber for generating air flow amplification characteristics of air introduced into the interior chamber of the oven; and,
   increasing the air pressure of the input source of air to a desired level at an exit of the air amplifier member in relation to the pressure of the input source of air entering the air amplifier member.

6. The method of claim 5 wherein an air guide body is attached to the exit of the air amplifier to guide and assist in raising a temperature of the air existing from the air amplifier member.

7. The method of claim 5 wherein the air amplifier member includes a venture element for increasing fluid flow velocity therethrough.

8. The method of claim 5 further including a heater element mounted within the air amplifier member.

* * * * *

UNITED STATES PATENT AND TRADEMARK OFFICE
CERTIFICATE OF CORRECTION

PATENT NO. : 7,309,847 B2
APPLICATION NO. : 11/613041
DATED : December 18, 2007
INVENTOR(S) : Tuan Q. Cao It is certified that error appears in the above-identified patent and that said Letters Patent is hereby corrected as shown below:

In the Abstract, Title Page Item (57) first line the word "over" should read --oven--.

The 1st Line of Abstract should read --An oven (10) for a gas generating system (C) of the type that--.

Signed and Sealed this

Sixth Day of May, 2008

JON W. DUDAS
*Director of the United States Patent and Trademark Office*